United States Patent [19]

Andreshak et al.

[11] Patent Number: 5,664,061
[45] Date of Patent: Sep. 2, 1997

[54] INTERACTIVE COMPUTER SYSTEM RECOGNIZING SPOKEN COMMANDS

[75] Inventors: Joseph Charles Andreshak, Mahopac; Gregg H. Daggett, Yorktown Heights, both of N.Y.; John Karat, Greenwich, Conn.; John Lucassen, New York, N.Y.; Stephen Eric Levy, Valhalla, N.Y.; Robert Lawrence Mack, Yorktown Heights, N.Y.

[73] Assignee: International Business Machines Corporation, Armonk, N.Y.

[21] Appl. No.: 462,735

[22] Filed: Jun. 5, 1995

Related U.S. Application Data

[63] Continuation of Ser. No. 50,950, Apr. 21, 1993, abandoned.
[51] Int. Cl.[6] ............................................ G10L 9/06
[52] U.S. Cl. .................... 704/275; 704/231; 704/235; 704/251; 704/270
[58] Field of Search ..................................... 395/2.44, 2.4, 395/2.6, 2.79, 2.84

[56] References Cited

U.S. PATENT DOCUMENTS

| | | | |
|---|---|---|---|
| 4,509,133 | 4/1985 | Monbaron et al. | 381/43 |
| 4,677,569 | 6/1987 | Nakano et al. | 395/2.84 |
| 4,704,696 | 11/1987 | Reimer et al. | 395/2.84 |
| 4,759,068 | 7/1988 | Bahl et al. | 381/43 |
| 4,776,016 | 10/1988 | Hansen | 381/43 |
| 4,931,950 | 6/1990 | Isle et al. | 395/11 |
| 4,980,918 | 12/1990 | Bahl et al. | 381/43 |
| 5,157,384 | 10/1992 | Greanis et al. | 345/156 |
| 5,182,773 | 1/1993 | Bahl et al. | 381/41 |
| 5,195,167 | 3/1993 | Bahl et al. | 395/2 |

FOREIGN PATENT DOCUMENTS

| | | | |
|---|---|---|---|
| 0414238A2 | 8/1990 | European Pat. Off. | G06F 3/16 |

OTHER PUBLICATIONS

Bahl, L.R., et al. "Vector Quantization Procedure For Speech Recognition Systems Using Discrete Parameter Phoneme-Based Markov Word Models." *IBM Technical Disclosure Bulletin*, vol. 32, No. 7, Dec. 1989, pp. 320 and 321.

Jelinek, F. "Continuous Speech Recognition By Statistical Methods." *Proceedings of the IEEE*, vol. 64, No. 4, Apr. 1976 pp. 532–536.

IBM Tech. Disc. Bulletin vol. 33, No. 11, Apr. 91, pp. 368–371, "Integrated Audio-Graphics User Interface".

(List continued on next page.)

*Primary Examiner*—Allen R. MacDonald
*Assistant Examiner*—Alphonso A. Collins

[57] ABSTRACT

An interactive computer system having a processor executing a target computer program, and having a speech recognizer for converting an utterance into a command signal for the target computer program. The target computer program has a series of active program states occurring over a series of time periods. At least a first active-state image is displayed for a first active state occurring during a first time period. At least one object displayed in the first active-state image is identified, and a list of one or more first active-state commands identifying functions which can be performed in the first active state of the target computer program is generated from the identified object. A first active-state vocabulary of acoustic command models for the first active state comprises the acoustic command models from a system vocabulary representing the first active-state commands. A speech recognizer measures the value of at least one feature of an utterance during each of a series of successive time intervals within the first time period to produce a series of feature signals. The measured feature signals are compared to each of the acoustic command models in the first active-state vocabulary to generate a match score for the utterance and each acoustic command model. The speech recognizer outputs a command signal corresponding to the command model from the first active-state vocabulary having the best match score.

25 Claims, 8 Drawing Sheets

OTHER PUBLICATIONS

C. Schmandt et al., "Augmenting a Window System with Speech Input," Computer, Apr. 1990, Z3(9):50–56.

T.B. Martin, "One Way to Talk to Computers," IEEE Spectrum, May. 1977, pp. 35–39.

Interstate Electronics Corp., "Voice:The Optimum Source–Data Entry Method," 1978.

INTERACTIVE COMPUTER SYSTEM RECOGNIZING SPOKEN COMMANDS

This application is a continuation of application Ser. No. 08/050,950 filed Apr. 21, 1993, now abandoned.

BACKGROUND OF THE INVENTION

The invention relates to interactive computer systems in which a user provides commands to a target computer program executing on the computer system by way of an input device. The input device may be, for example, a keyboard, a mouse device, or a speech recognizer. For each input device, an input signal generated by the input device is translated into a form usable by the target computer program.

An interactive computer system in which the user can provide commands by speaking the commands may consist of a processor executing a target computer program having commands identifying functions which can be performed by the target computer program. The computer system further includes a speech recognizer for recognizing the spoken commands and for outputting command signals corresponding to the recognized commands. The speech recognizer recognizes a spoken command by measuring the value of at least one feature of an utterance during each of a series of successive time intervals to produce a series of feature signals, comparing the measured featured signals to each of a plurality of acoustic command models to generate a match score for the utterance and each acoustic command model, and outputting a command signal corresponding to the command model having the best match score.

The set of utterance models and words represented by the utterance models which the speech recognizer can recognize is referred to as the system vocabulary. The system vocabulary is finite and may, for example, range from one utterance model to thousands of utterance models. Each utterance model may represent one word, or may represent a combination of two or more words spoken continuously (without a pause between the words).

The system vocabulary may contain, for example, utterance models of all of the commands to which the target computer program is capable of responding. However, as the number of utterance models increases, the time required to perform utterance recognition using the entire system vocabulary increases, and the recognition accuracy decreases.

Generally, a target computer program has a series of active states occurring over a series of time periods. For each active state, there may be a list of active state commands identifying functions which can be performed in the active state. The active state commands may be a small subset of the system vocabulary. The translation of an uttered command to a form usable by the target computer program in one state of the target computer program may be different from the translation of the same command in another state of the target computer program.

In order to improve the speed and accuracy of the speech recognizer, it is desirable to restrict the active vocabulary of utterance models which the speech recognizer can recognize in any given time period to the active state commands identifying functions which can be performed by the target computer program in that time period. To attempt to achieve this result, the speech recognizer may be provided with a finite state machine which duplicates the active states and transitions between active states of the target computer program.

In practice, it has been found impossible to build a finite state machine for the speech recognizer which exactly duplicates the active states and transitions between active states of the target computer program. The target computer program not only interacts with the user, but also interacts with data and other devices of the computer system whose states cannot be known in advance.

For example, a command to load a file will cause a computer program to make a transition to one state if the file exists, or to a different state if the file does not exist. However, the speech recognizer finite state machine must be built with some assumption that the file exists or does not exist. If a command to load a file is spoken to the computer program using the speech recognizer, then the speech recognizer finite state machine may or may not track the computer program state correctly, depending on whether that file exists or does not exist. If the speech recognizer finite state machine assumes that the file exists, but in fact the file does not exist, then the speech recognizer state machine will enter a state different from the state of the target computer program. As a result, the target computer program can no longer receive valid input from the speech recognizer.

SUMMARY OF THE INVENTION

It is an object of the invention to provide an interactive computer system having a target computer program having a series of active program states occurring over a series of time periods, and having a speech recognizer in which the active vocabulary of commands recognized by the speech recognizer in any given time period is restricted to a list of active commands identifying functions which can be performed by the target computer program in that given time period, without having to predict in advance the states and transitions between states of the target computer program which will occur under all possible circumstances.

According to the invention, an interactive conjurer system comprises a processor executing a target computer program having a series of active program states occurring over a series of time periods. The target computer program generates active state image data signals representing an active state image for the active state of the target computer program occurring during each time period. Each active state image contains one or more objects.

The interactive computer system further comprises means for displaying at least a first active-state image for a first active state occurring during a first time period. Means are provided for identifying at least one object displayed in the first active-state image, and for generating from the identified object a list of one or more first active-state commands identifying functions which can be performed in the first active state of the target computer program.

Means are also provided for storing a system vocabulary of acoustic command models. Each acoustic command model represents one or more series of acoustic feature values representing an utterance of one or more words associated with the acoustic command model. The system further includes means for identifying a first active-state vocabulary of acoustic command models for the first active state. The first active-state vocabulary comprises the acoustic command models from the system vocabulary representing the first active-state commands.

The interactive computer system comprises a speech recognizer for measuring the value of at least one feature of an utterance during each of a series of successive time intervals within the first time period to produce a series of feature signals. The speech recognizer compares the measured feature signals to each of the acoustic command models in the first active-state vocabulary to generate a match score for the utterance and each acoustic command model. The speech recognizer then outputs a command signal corresponding to the command model from the first active-state vocabulary having the best match score.

The first active-state vocabulary preferably comprises substantially less than all the acoustic command models from the system vocabulary. The speech recognizer does not compare the measured feature signals for the first time period to any acoustic command model which is not in the first active-state vocabulary.

In one embodiment of the interactive computer system according to the invention, the display means displays at least a second active-state image different from the first active-state image for a second active state occurring during a second time period different from the first time period. The object identifying means identifies at least one object displayed in the second active-state image, and generates a list of one or more second active-state commands identifying functions which can be performed in the second active state of the target computer program.

The active-state vocabulary identifying means identifies a second active-state vocabulary of acoustic command models for the second active state. The second active-state vocabulary comprises the acoustic command models from the system vocabulary representing the second active-state commands. The second active-state vocabulary is at least partly different from the first active-state vocabulary.

The speech recognizer measures the value of at least one feature of an utterance during each of a series of successive time intervals within the second time period to produce a series of feature signals. The speech recognizer compares the measured feature signals for the second time period to each of the acoustic command models in the second active-state vocabulary to generate a match score for the utterance and each acoustic command model. The speech recognizer then outputs a command signal corresponding to the command model from the second active-state vocabulary having the best match score.

The target computer program may, for example, have only one active state occurring during each time period. The target computer program may comprise an operating system program alone, an application program and an operating system program combined, or two or more application programs and an operating system program.

At least some of the commands for an active-state identify functions which can be performed on the identified objects in the active-state image for the state.

The identified object in an active-state image may, for example, comprise one or more of a character, a word, an icon, a button, a scroll bar, a slider, a list box, a menu, a check box, a container, or a notebook.

In an alternative embodiment of the invention, the speech recognizer may output two or more command signals corresponding to the command models from the active-state vocabulary having the best match scores for a given time period.

The vocabulary of acoustic command models for each active state may further comprise a set of global acoustic command models representing global commands identifying functions which can be performed in each active state of the target computer program.

The display means may comprise, for example, a cathode ray tube display, a liquid crystal display, or a printer.

The display means may display both an active-state image for an active state occurring during a time period, and at least a portion of one or more images for program states not occurring during the time period.

A method of computer interaction according to the invention comprises executing, on a processor, a target computer program having a series of active program states occurring over a series of time periods. The target computer program generates active state image data signals representing an active state image for the active state of the target computer program occurring during each time period. Each active state image contains one or more objects. The method further comprises displaying at least a first active-state image for a first active state occurring during a first time period. At least one object displayed in the first active-state image is identified, and a list of one or more first active-state commands identifying functions which can be performed in the first active state of the target computer program is generated from the identified object.

A system vocabulary of acoustic command models is stored. Each acoustic command model represents one or more series of acoustic feature values representing an utterance of one or more words associated with the acoustic command model. A first active-state vocabulary of acoustic command models for the first active state is identified. The first active-state vocabulary comprises the acoustic command models from the system vocabulary representing the first active-state commands.

The value of at least one feature of an utterance is measured during each of a series of successive time intervals within the first time period to produce a series of feature signals. The measured feature signals are compared to each of the acoustic command models in the first active-state vocabulary to generate a match score for the utterance and each acoustic command model. A command signal corresponding to the command model from the first active state vocabulary having the best match score is output.

By identifying at least one object displayed in the active-state image of the target computer program, and by generating from the identified object a list of one or more active-state commands identifying functions which can be performed in the active state of the target computer program, the active-state vocabulary of the speech recognizer can be limited to a small subset of the system vocabulary representing active-state commands, without having to predict in advance the states and transitions between states of the target computer program which will occur under all possible circumstances.

DESCRIPTION OF THE PREFERRED EMBODIMENTS

Figure 1:
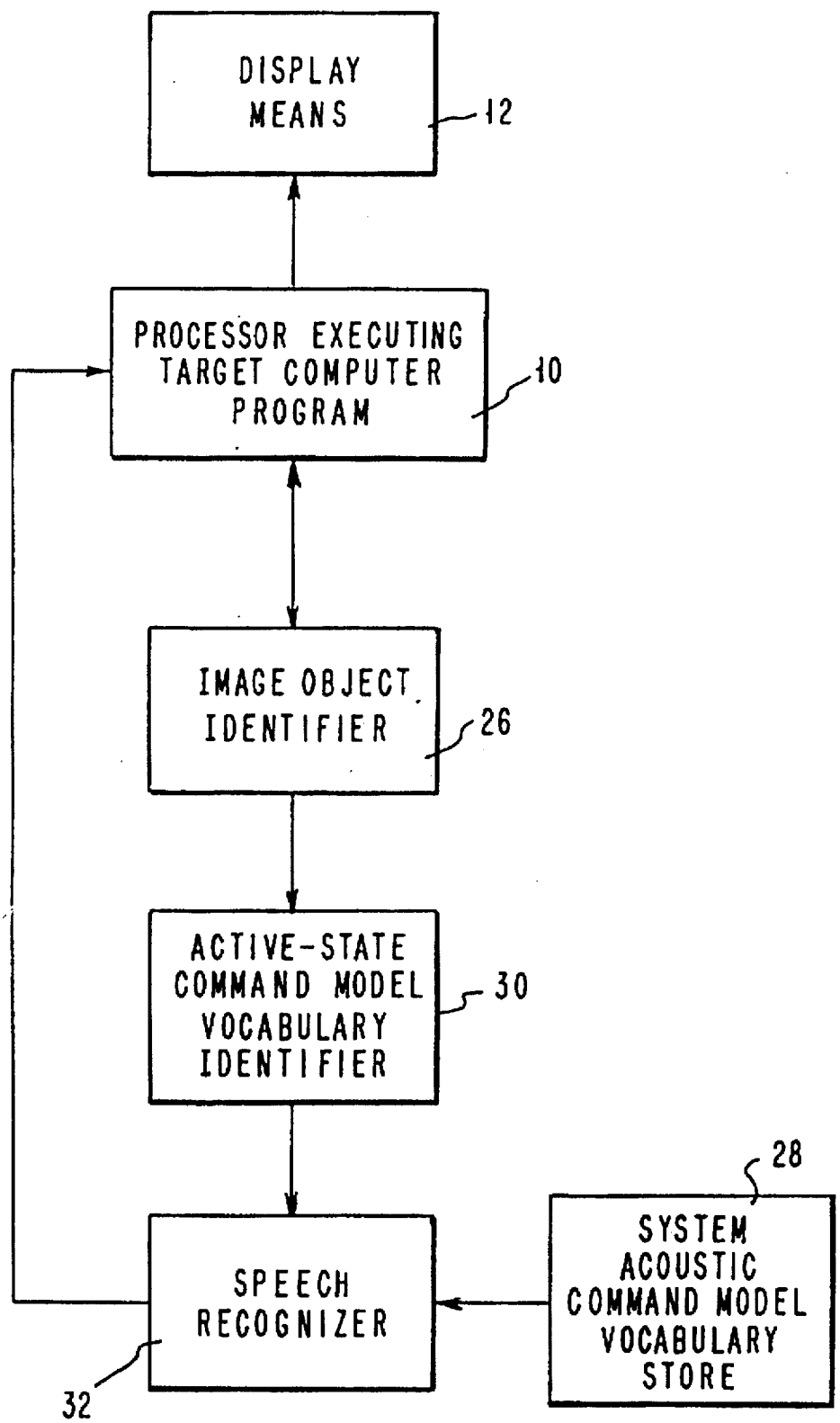
FIG. 1 is a block diagram of an example of an interactive computer system according to the invention.

FIG. 1 is a block diagram of an example of an interactive computer system according to the invention. The interactive computer system comprises a processor 10 executing a target computer program having a series of active program states occurring over a series of time periods. The target computer program generates active state image data signals representing an active state image for the active state of the target computer program occurring during each time period. Each active state image contains one or more objects.

The processor may be, for example, a personal computer, a computer work station, or any other microcomputer, minicomputer, or main frame computer.

Figure 1A:
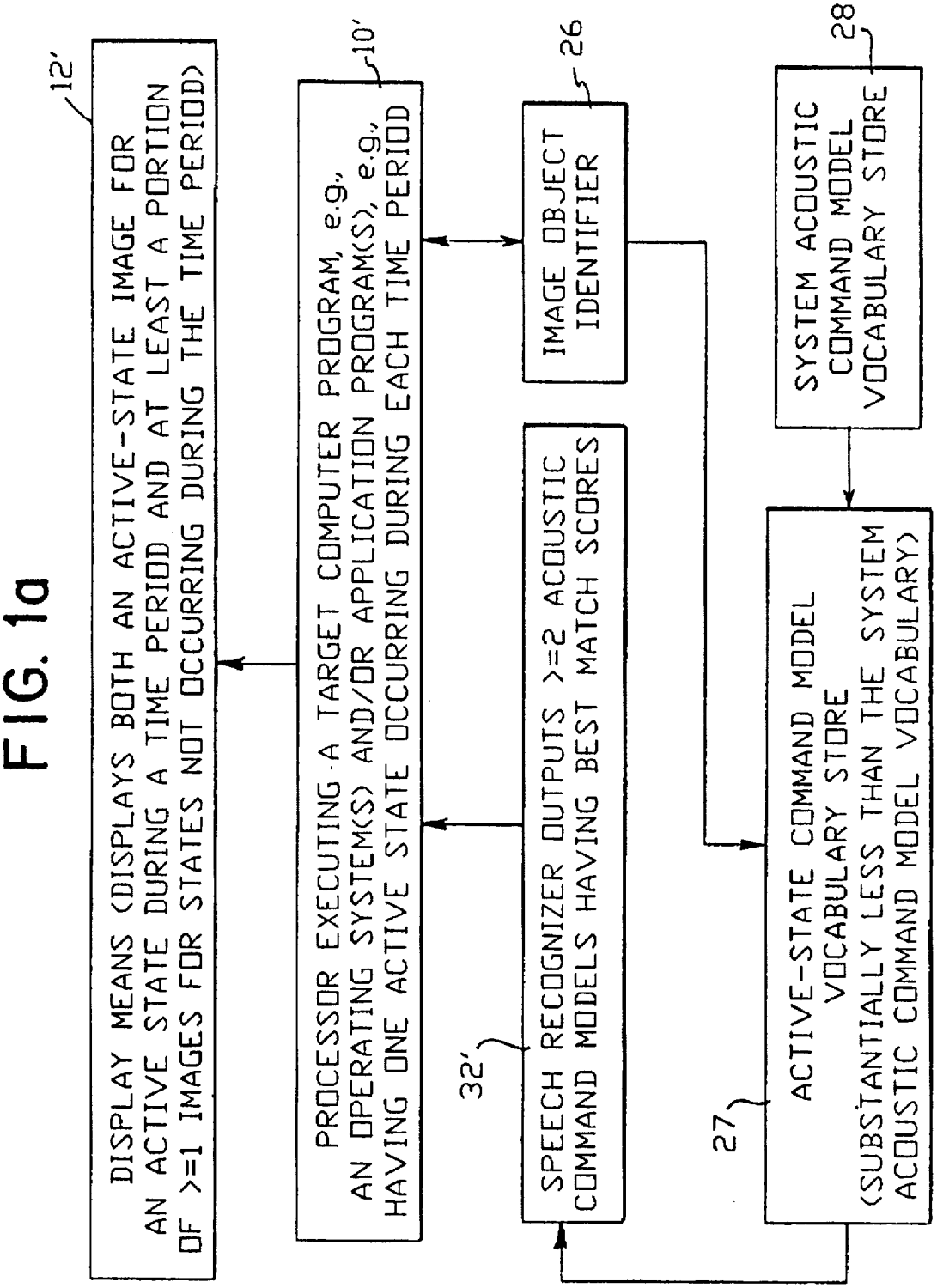
FIG. 1a is another example of an interactive computer system according to the invention.

Examples of the target computer program of FIG. 1 block 10 are shown in FIG. 1a block 10'. As shown, the target computer program may be an operating system program such as DOS, Microsoft Windows (trademark), OS/2 (trademark), AIX (trademark), UNIX (trademark), X-Windows, or any other operating system. The target computer program may comprise one or more application programs executing with an operating system program. Application programs include spreadsheet programs, word processing programs, database programs, educational programs, recreational programs, communication programs, and many more.

Objects in an active-state image may comprise one or more of a character, a word, an icon, a button, a scroll bar, a slider, a list box, a menu, a check box, a container, a notebook, or some other items.

The interactive computer system further comprises display means 12 for displaying at least a first active-state image for a first active state occurring during a first time period. The display means may be, for example, a cathode ray tube display, a liquid crystal display, or a printer.

Figure 2:
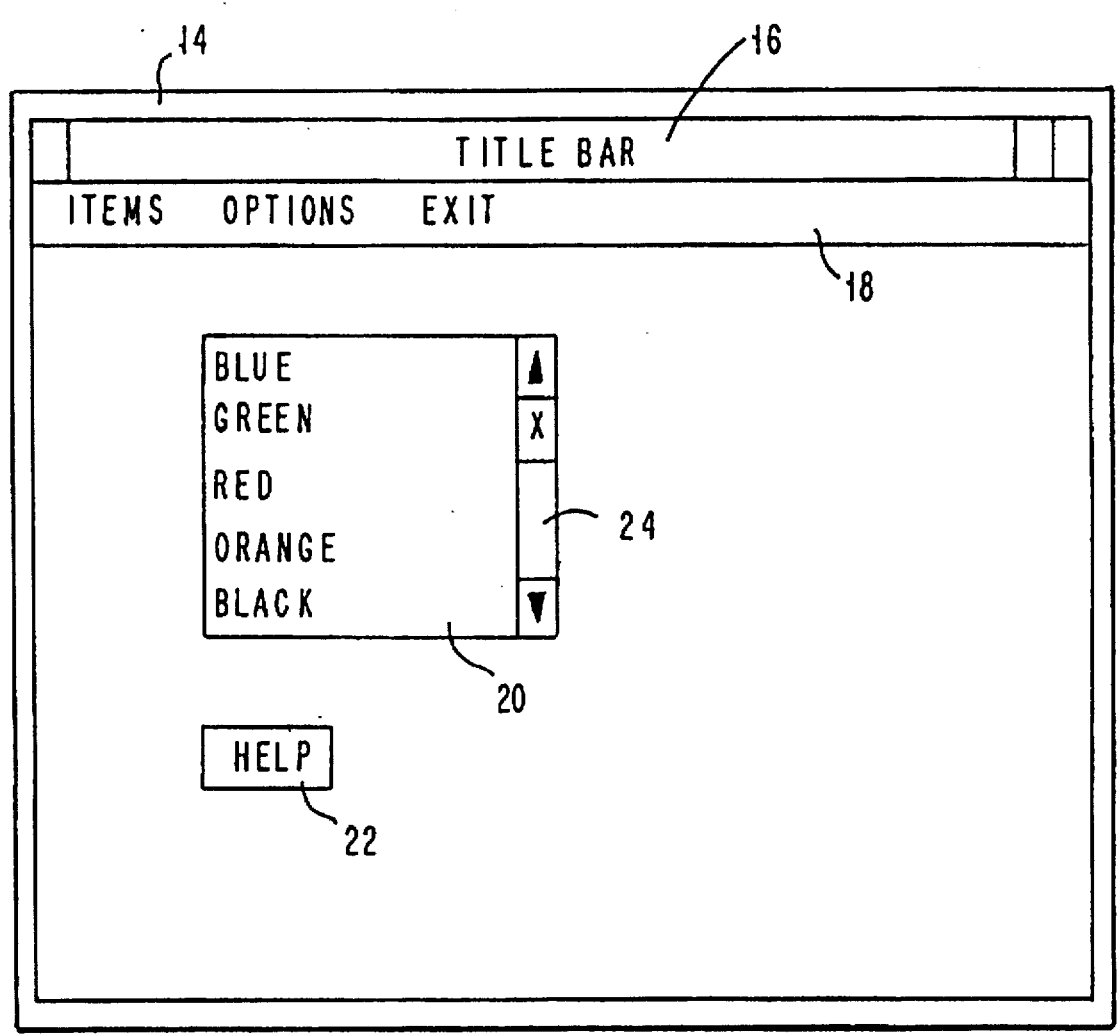
FIG. 2 shows an example of a first active-state image for a first active state of a target computer program.

FIG. 2 shows an example of a hypothetical first active-state image for a first active state occurring during a first time period. In this example, the active-state image includes a frame object 14 containing a title bar object 16, a menu bar object 18, a list box object 20, and a push button object 22. The menu bar object 18 includes an "items" object, an "options" object, and an "exit" object. The list box object 20 includes a vertical scroll bar object 24, and "blue", "green", "red", "orange", "black", "white", and "purple" objects. In the list box 20, only the "blue", "green", "red", "orange", and "black" objects are shown in FIG. 2. The "white" and "purple" objects are contained in the list box and could be made visible by scrolling with the vertical scroll bar 24.

The active state image data signals may be generated by the target computer program, for example, by using operating system interrupts, function calls, or application program interface calls.

Example I, below, illustrates C programming language source code for creating active state image data signals.

Returning to FIG. 1, the interactive computer system further comprises an image object identifier 26 for identifying at least one object displayed in the first active-state image, and for generating from the identified object a list of one or more first active-state commands identifying functions which can be performed in the first active-state of the target computer program.

The image object identifier 26 may comprise computer program subroutines designed to intercept (hook) operating system function calls, and application program interface calls provided by one or more target computer programs, and/or may comprise computer program subroutines for using operating system interrupts, function calls, or application program interface calls for identifying objects displayed in the first active-state image of the target computer program. Example II, below, illustrates C programming language source code for identifying at least one object displayed in an active state image.

Table 1 shows a hypothetical example of a list of first active-state commands identifying functions which can be performed in the first active-state of the target computer program for the objects displayed in the first active-state image of FIG. 2.

TABLE 1

| Object | Spoken Command | Function |
|---|---|---|
| Frame | FRAME | changes the focus to the entire frame |
| | TOP BORDER | identifies frame element to be moved |
| | BOTTOM BORDER | identifies frame element to be moved |
| | LEFT BORDER | identifies frame element to be moved |
| | RIGHT BORDER | identifies frame element to be moved |
| | LEFT | moves frame or frame element left |
| | RIGHT | moves frame or frame element right |
| | UP | moves frame or frame element up |
| | DOWN | moves frame or frame element down |
| Title Bar | none | none |
| Menu Bar | CLOSE MENU | hides the menu |
| | MENU | changes the focus to the menu bar |
| | SELECT | selects the item at the cursor |
| "ITEMS" | ITEMS | activates the "ITEMS" menu |
| "COLORS" | COLORS | activates the "COLORS" menu |
| "NAMES" | NAMES | activates the "NAMES" menu |
| "ADDRESSES" | ADDRESSES | activates the "ADDRESSES" menu |
| "OPTIONS" | OPTIONS | activates a dialog to select options |
| "EXIT" | EXIT | exits the current program state |
| | CANCEL | dismisses the pop-up menu |
| System Menu | CLOSE MENU | hides the menu |
| | MENU | changes the focus to another menu, if any |
| | SELECT | selects the item at the cursor |
| | RESTORE | restores window to previous size and position |
| | MINIMIZE | reduces window to smallest size |
| | MAXIMIZE | increases window to largest size |
| | CLOSE | exits the current program state |
| | WINDOW LIST | displays a list of running programs |
| Vertical Scroll Bar | SCROLL BAR | sets focus on the scroll bar |
| | UP | moves the list box up through the subject being displayed |

TABLE 1-continued

| Object | Spoken Command | Function |
|---|---|---|
| | DOWN | moves the list box down through the subject being displayed |
| | TOP | moves the list box to the top of the subject being displayed |
| | BOTTOM | moves the list box to the bottom of the subject being displayed |
| | PAGE UP | moves the list box up one page through the subject being displayed |
| | PAGE DOWN | moves the list box down one page through the subject being displayed |
| Push Button | PRESS | executes the push button |
| | PUSH BUTTON | executes the push button |
| "HELP" | HELP | executes the help facility |
| List Box | LIST BOX | changes the focus to list box |
| "BLUE" | BLUE | selects the named color |
| "GREEN" | GREEN | selects the named color |
| "RED" | RED | selects the named color |
| "ORANGE" | ORANGE | selects the named color |
| "BLACK" | BLACK | selects the named color |
| "WHITE" | WHITE | selects the named color |
| "PURPLE" | PURPLE | selects the named color |

As shown in the example of Table 1, each object may have zero or more commands identifying functions which can be performed in the first active state of the target computer program. At least some commands identify functions which can be performed on the identified object in the active-state image for the state. For example, the command "FRAME" changes the focus to the entire frame object 14 of FIG. 2. With the focus on the entire frame object 14, the spoken command "LEFT" operates on the frame object by moving it to the left on the display screen.

Returning again to FIG. 1, the interactive computer system comprises a system acoustic command model vocabulary store 28 for storing a system vocabulary of acoustic command models. Each acoustic command model represents one or more series of acoustic feature values representing an utterance of one or more words associated with the acoustic command model.

The stored acoustic command models may be, for example, Markov models or other dynamic programming models. The parameters of the acoustic command models may be estimated from a known uttered training text (for example, 257 sentences) by, for example, smoothing parameters obtained by the forward-backward algorithm. (See, for example, Jelinek. "Continuous Speech Recognition By Statistical Methods". Proceedings of the IEEE. Volume 64, No. 4, April 1976 pages 532–536.)

Preferably, each acoustic command model represents a command spoken in isolation (that is, independent of the context of prior and subsequent utterances). Context-independent acoustic command models can be produced, for example, either manually from models of phonemes or automatically, for example, by the method described by Lalit R. Bahl et al in U.S. Pat. No. 4,759,068 entitled "Constructing Markov Models of Words from Multiple Utterances", or by any other known method of generating context-independent models.

Alternatively, context-dependent models may be produced from context-independent models by grouping utterances of a command into context-dependent categories. A context can be, for example, manually selected, or automatically selected by tagging each feature signal corresponding to a command with its context, and by grouping the feature signals according to their context to optimize a selected evaluation function. (See, for example, Lalit R. Bahl et al, "Apparatus And Method Of Grouping Utterances Of A Phoneme Into Context-Dependent Categories Based On Sound-Similarity For Automatic Speech Recognition." U.S. Pat. No. 5,195,167.)

As shown in the block diagram of FIG. 1, the interactive computer system comprises an active-state command model vocabulary identifier 30 for identifying a first active-state vocabulary of acoustic command models for the first active state. The first active-state vocabulary comprises the acoustic command models from the system vocabulary 28 representing the first active-state commands from the image object identifier 26. Example III, below, illustrates C programming language source code for identifying an active-state vocabulary. Example IV, below, illustrates C programming language source code for defining the active-state vocabulary to the speech recognizer.

As shown in FIG. 1a, the active-state vocabulary 27 preferably comprises substantially less than all of the acoustic command models in the system vocabulary. For example, each active-state vocabulary may comprise 50 to 200 commands. The entire system command vocabulary may comprise 500 to 700 or more commands. The speech recognizer does not compare the measured feature signals for a time period to any acoustic command model which is not in the active-state vocabulary for that time period.

Returning to FIG. 1, recognizer 32 measures the value of at least one feature of an utterance during each of a series of successive time intervals within the first time period to produce a series of feature signals. The speech recognizer 32 compares the measured feature signal to each of the acoustic command models in the first active-state vocabulary to generate a match score for the utterance and each acoustic command model. The speech recognizer 32 outputs a command signal corresponding to the command model from the first active-state vocabulary having the best match score.

Example V, below, illustrates c programming language source code for outputting a command signal corresponding to the command model from an active-state vocabulary having the best match score.

Figure 3:
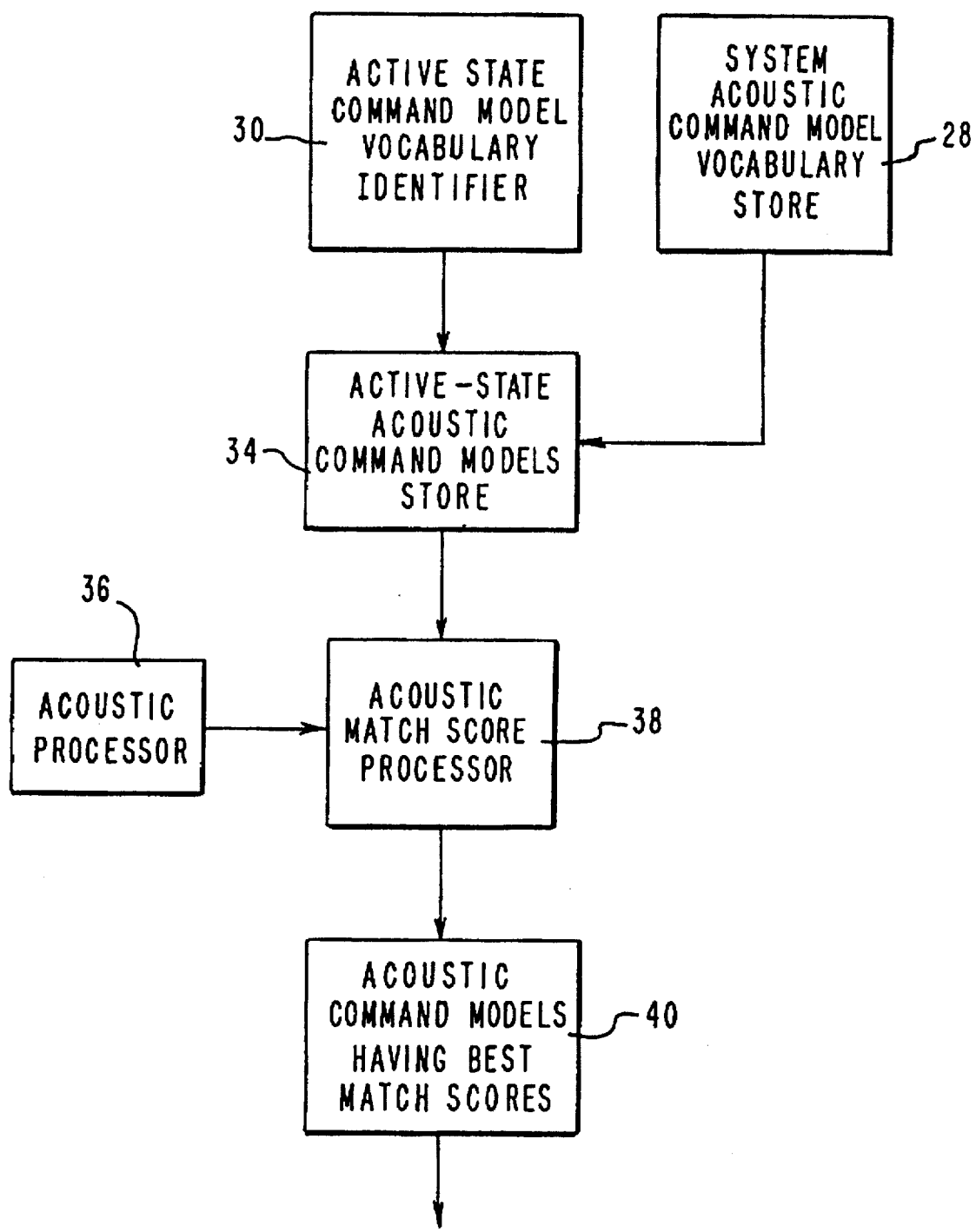
FIG. 3 is a block diagram of an example of a speech recognizer for an interactive computer system according to the invention.

FIG. 3 is a block diagram of an example of a speech recognizer for an interactive computer system according to the invention. In this example, the speech recognizer 32 comprises an active-state acoustic command model store 34 for storing the active-state vocabulary comprising the acoustic command models from the system vocabulary store 28 representing the active-state commands identified in active state command model vocabulary identifier 30.

The speech recognizer 32 further comprises an acoustic processor 36 for measuring the value of at least one feature of an utterance during each of a series of successive time intervals within each active-state time period to produce a series of feature signals. An acoustic match score processor 38 compares the measured feature signals from acoustic processor 36 to each of the acoustic command models in the active-state acoustic command models store 34 to generate a match score for the utterance and each acoustic command model. An output 40 outputs one or more command signals corresponding to the command models from the active state vocabulary having the best match scores for a given time period.

Preferably, only one command signal corresponding to the command model from the first active-state vocabulary having the best match score is output. In this case, the one output command may be immediately executed. One example of the speech recognizer of FIG. 1 is shown in FIG. 1a. Specifically, in the speech recognizer 32', if two or more command signals corresponding to the command models from the active-state vocabulary having the best match scores for a given time period are output, then the recognized commands may be displayed for the user to select one for execution.

The speech recognizer may be a publicly available product such as the IBM Voice Type II (trademark) or the IBM Speech Server Series (trademark). In products containing a fast acoustic match and a detailed acoustic match, both acoustic matches may be used in the invention. Alternatively, since the image object identifier 26 and the active state command model vocabulary identifier 30 select only a small subset of the system vocabulary in store 28 for the acoustic match, the fast acoustic match can be omitted.

In speech recognition products containing a language model, the language model can be omitted. Alternatively, all of the words in the active-state vocabulary can be assigned equal language model probabilities.

In speech recognizer products having hypothesis search algorithms for generating multiple-word hypotheses, the recognition of a word is dependent in part on the recognition of successive words. Such a hypothesis search algorithm need not be used with the present invention in which, preferably, each command is independent of successive commands.

Preferably, both the target computer program and the speech recognizer are executed on the same central processing unit in a time sharing manner. Alternatively, the target computer program and the speech recognizer can be executed on different central processing units, for example using a client-server architecture.

In the interactive computer system according to the invention, the display means may further display at least a second active-state image different from the first active-state image for a second active state occurring during a second time period different from the first time period.

Figure 4:
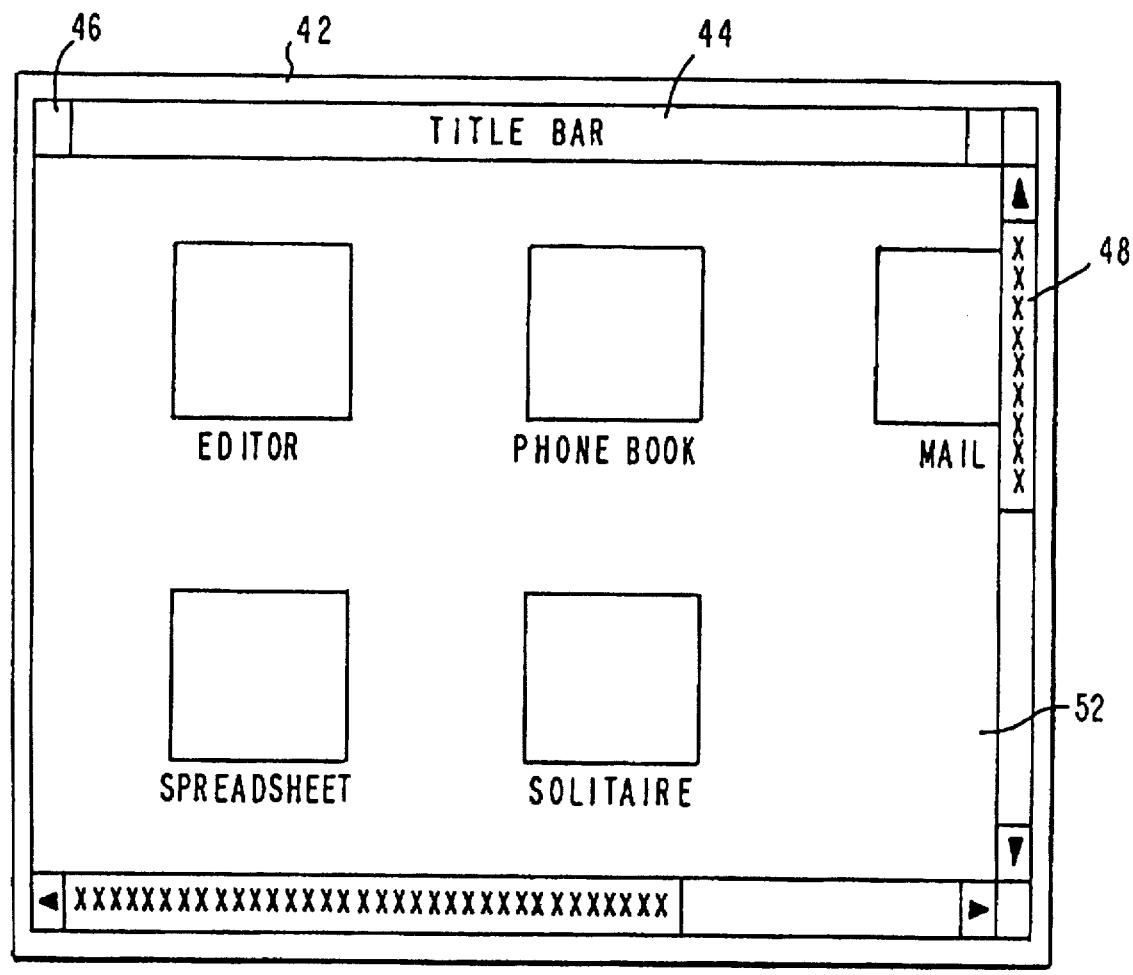
FIG. 4 shows an example of a second active-state image for a second active state of a target computer program.

FIG. 4 shows an example of a second active-state image for a second active state of the target computer program. The second active-state image shown in FIG. 4 contains a frame object a title bar object 44, a system menu object 46, a vertical scroll 42, bar object 48, a horizontal scroll bar object 50, and a container object 52. The container object 52 contains an "editor" object, a "phone book" object, a "spreadsheet" object, a "mail" object, and a "solitaire" object.

The object identifying means identifies at least one object displayed in the second active-state image, and generates from the identified object a list of one or more second active-state commands identifying functions which can be performed in the second active-state of the target computer program.

Table 2 is an example of a hypothetical list of commands for each object shown in FIG. 4 identifying functions which can be performed in the second active-state of the target computer program.

TABLE 2

| Object | Spoken Command | Function |
|---|---|---|
| Frame | FRAME | changes the focus to the entire frame |
| | TOP BORDER | identifies frame element to be moved |
| | BOTTOM BORDER | identifies frame element to be moved |
| | LEFT BORDER | identifies frame element to be moved |
| | RIGHT BORDER | identifies frame element to be moved |
| | LEFT | moves frame or frame element left |
| | RIGHT | moves frame or frame element right |
| | UP | moves frame or frame element up |
| | DOWN | moves frame or frame element down |
| Title Bar | none | none |
| System Menu | CLOSE MENU | hides the menu |
| | MENU | changes the focus to another menu, if any |
| | SELECT | selects the item at the cursor |
| | RESTORE | restores window to previous size and position |
| | MINIMIZE | reduces window to smallest size |
| | MAXIMIZE | increases window to largest size |
| | CLOSE | exits the current program state |
| | WINDOW LIST | displays a list of running programs |
| Vertical Scroll Bar | SCROLL BAR | sets focus on the next scroll bar |
| | UP | moves the container up through the subject being displayed |
| | DOWN | moves the container down through the subject being displayed |
| | TOP | moves the container to the top of the subject being displayed |
| | BOTTOM | moves the container to the bottom of the subject being displayed |
| | PAGE UP | moves the container up one page through the subject being displayed |
| | PAGE DOWN | moves the container down one page through the subject being displayed |
| Horizontal Scroll Bar | SCROLL BAR | sets focus on the next scroll bar |
| | LEFT | moves the container left through the subject being displayed |
| | RIGHT | moves the container right through the subject being displayed |
| | EXTREME LEFT | moves the container to the extreme left of the subject being displayed |
| | EXTREME RIGHT | moves the container to the extreme right of the subject being displayed |
| | PAGE LEFT | moves the container left one page through the subject being displayed |
| | PAGE RIGHT | moves the container right one page through the subject being displayed |
| Container | CONTAINER | changes the focus to the container |
| | SELECT ALL | executes all programs in the container |
| Editor | EDITOR | executes the Editor program |

TABLE 2-continued

| Object | Spoken Command | Function |
| --- | --- | --- |
| Phone Book | PHONE BOOK | executes the Phone Book program |
| Spreadsheet | SPREADSHEET | executes the Spreadsheet program |
| Mail | MAIL | executes the Mail program |
| Solitaire | SOLITAIRE | executes the Solitaire program |

Comparing FIGS. 2 and 4, the first active-state image differs from the second active-state image by providing menu bar object 18, list box object 20, and push button object 22 in the first active-state image but not in the second active-state image. The horizontal scroll bar 50, and the editor, phone book, mail, spreadsheet, and solitaire objects are provided in the second active-state image, but not in the first active-state image.

The active-state vocabulary identifying means further identifies a second active-state vocabulary of acoustic command models for the second active state. The second active state vocabulary comprises the acoustic command models from the system vocabulary representing the second active-state commands. The second active-state vocabulary is at least partly different from the first active-state vocabulary.

Comparing Tables 1 and 2, the first active-state vocabulary comprises the spoken commands listed in Table 1. The second active-state vocabulary comprises the spoken commands listed in Table 2. In this example, the first active-state vocabulary is at least partly different from the second active-state vocabulary as shown therein.

The speech recognizer measures the value of at least one feature of an utterance during each of a series of successive time intervals within the second time period to produce a series of feature signals. The speech recognizer compares the measured feature signals for the second time period to each of the acoustic command models in the second active-state vocabulary to generate a match score for the utterance and each acoustic command model. The speech recognizer outputs a command signal corresponding to the command model from the second active-state vocabulary having the best match score.

As shown in FIG. 1a, the target computer program 10' preferably has only one active state occurring during each time period.

Figure 5:
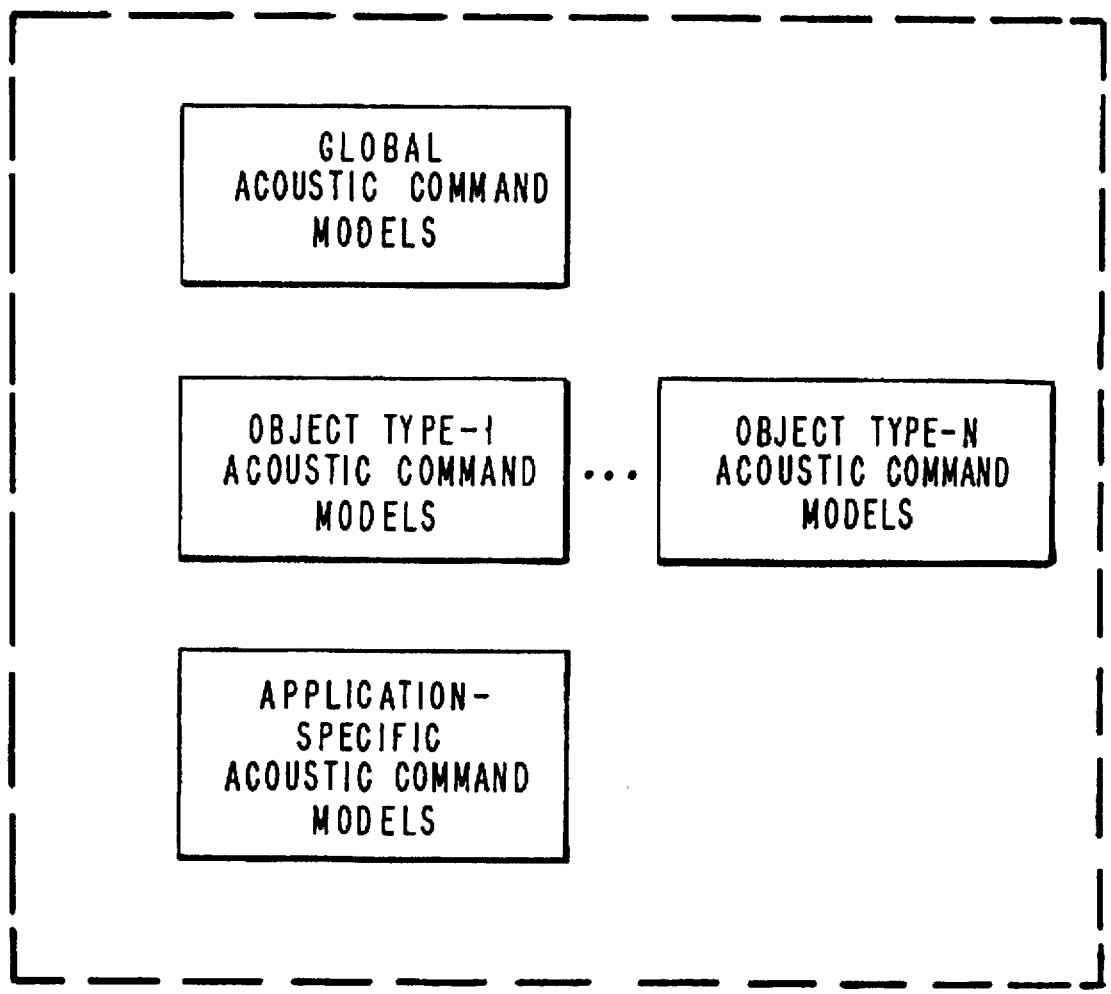
FIG. 5 is a block diagram of an example of an acoustic command model store for the system vocabulary of an interactive computer system according to the invention.

FIG. 5 is a block diagram of an example of the acoustic command model vocabulary store 28 of FIG. 1. The system vocabulary may comprise, for example, a set of global acoustic command models representing global commands identifying functions which can be performed in every active state of the target computer program.

Table 3 lists some examples of global commands represented by global acoustic command models.

TABLE 3

| Global Commands | |
| --- | --- |
| Spoken Command | Function |
| MICROPHONE OFF | turns the microphone off |
| ENTER | sends "ENTER" keystroke to keyboard input buffer |
| LEFT | sends "LEFT ARROW" keystroke to |

TABLE 3-continued

| Global Commands | |
| --- | --- |
| Spoken Command | Function |
| | keyboard input buffer |
| RIGHT | sends "RIGHT ARROW" keystroke to keyboard input buffer |
| PASTE | inserts contents of clipboard into application with the focus |
| WINDOW LIST | displays a list of running programs |
| EDITOR | executes the editor program |
| DESK top | makes the desk top window active |

The system vocabulary may further comprise object type acoustic command models associated with different types of objects. For example, as shown in Tables 1 and 2, frame object type acoustic commands include "frame", "top border", "bottom border", "left border", "right border", "left", "right", "up", and "down". Vertical scroll bar object type acoustic commands include "scroll bar", "up", "down", "top", "bottom", "page up", "page down". Push button object type acoustic command models include "press" and "push button".

Finally, the system vocabulary includes application-specific acoustic command models representing application-specific objects. In the examples of Tables 1 and 2, application-specific objects include the words "items", "colors", "names", "addresses", "phone book", "spreadsheet", "mail" and "solitaire".

One example of the display means 12 of FIG. 1 is shown in FIG. 1a. Specifically, the display means 12' may display both an active-state image for an active state occurring during a time period, and at least a portion of one or more images for program states not occurring during the time period.

Figure 6:
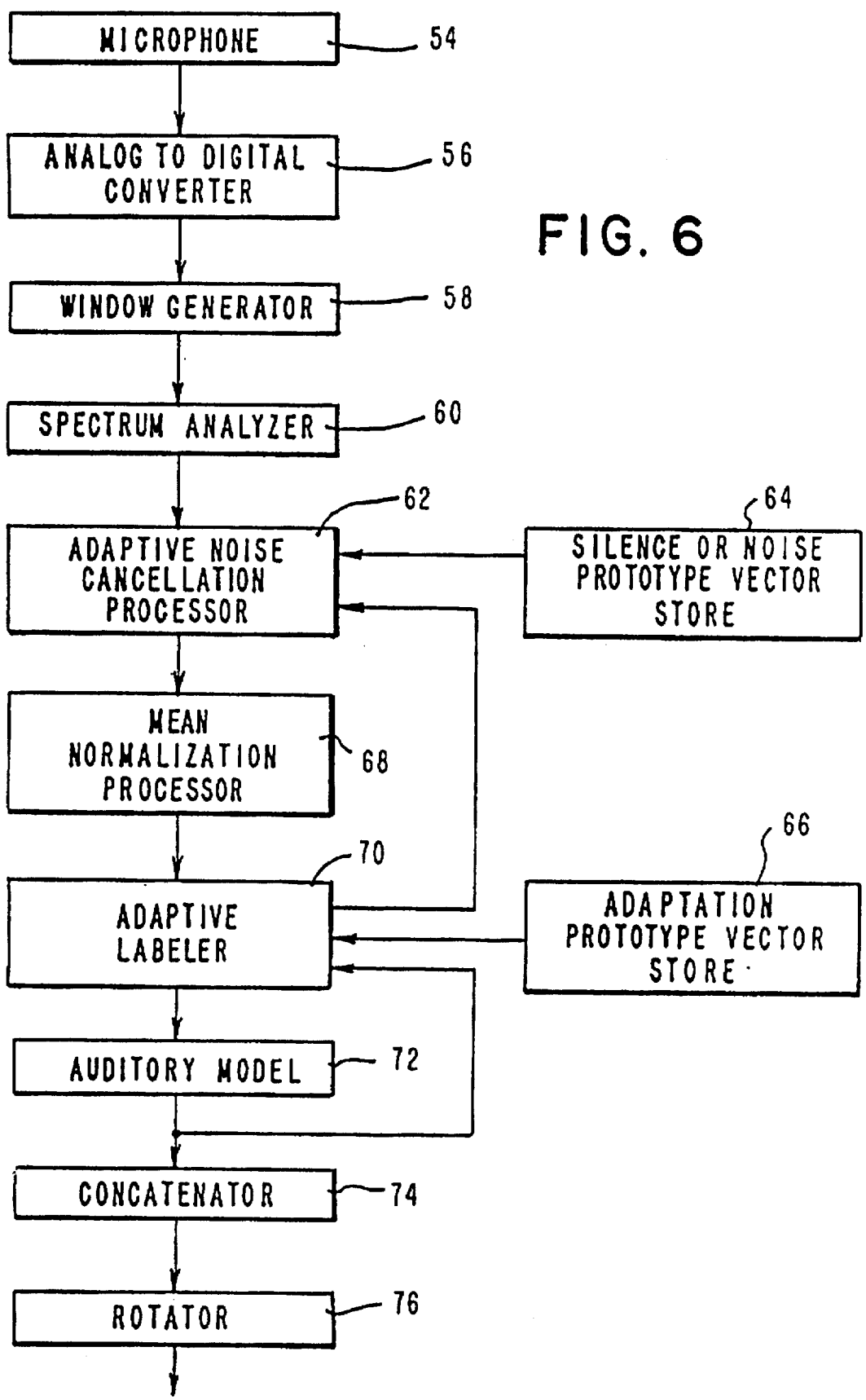
FIG. 6 is a block diagram of an acoustic processor for the speech recognizer of FIG. 3.

One example of the acoustic processor 36 of FIG. 3 is shown in FIG. 6. The acoustic processor comprises a microphone 54 for generating an analog electrical signal corresponding to the utterance. The analog electrical signal from microphone 54 is converted to a digital electrical signal by analog to digital converter 56. For this purpose, the analog signal may be sampled, for example, at a rate of twenty kilohertz by the analog to digital converter 56.

A window generator 58 obtains, for example, a twenty millisecond duration sample of the digital signal from analog to digital converter 56 every ten milliseconds (one centisecond). Each twenty millisecond sample of the digital signal is analyzed by spectrum analyzer 60 in order to obtain the amplitude of the digital signal sample in each of, for example, twenty frequency bands. Preferably, spectrum analyzer 60 also generates a twenty-first dimension signal representing the total amplitude or total power of the twenty millisecond digital signal sample. The spectrum analyzer 60 may be, for example, a fast Fourier transform processor. Alternatively, it may be a bank of twenty band pass filters.

The twenty-one dimension vector signals produced by spectrum analyzer 60 may be adapted to remove background noise by an adaptive noise cancellation processor 62. Noise cancellation processor 62 subtracts a noise vector N(t) from the feature vector F(t) input into the noise cancellation processor to produce an output feature vector F'(t). The noise cancellation processor 62 adapts to changing noise levels by periodically updating the noise vector N(t) whenever the prior feature vector F(t−1) is identified as noise or silence. The noise vector N(t) is updated according to the formula $$N(t) = \frac{N(t-1) + k[F(t-1) - Fp(t-1)]}{(1+k)}, \quad [1]$$

where N(t) is the noise vector at time t, N(t−1) is the noise vector at time (t−1), k is a fixed parameter of the adaptive noise cancellation model, F(t−1) is the feature vector input into the noise cancellation processor 62 at time (t−1) and which represents noise or silence, and Fp(t−1) is one silence or noise prototype vector, from store 64, closest to feature vector F(t−1).

The prior feature vector F(t−1) is recognized as noise or silence if either (a) the total energy of the vector is below a threshold, or (b) the closest prototype vector in adaptation prototype vector store 66 to the feature vector is a prototype representing noise or silence. For the purpose of the analysis of the total energy of the feature vector, the threshold may be, for example, the fifth percentile of all feature vectors (corresponding to both speech and silence) produced in the two seconds prior to the feature vector being evaluated.

After noise cancellation, the feature vector F'(t) is normalized to adjust for variations in the loudness of the input speech by short term mean normalization processor 68. Normalization processor 68 normalizes the twenty-one dimension feature vector F'(t) to produce a twenty dimension normalized feature vector X(t). The twenty-first dimension of the feature vector F'(t), representing the total amplitude or total power, is discarded. Each component i of the normalized feature vector X(t) at time t may, for example, be given by the equation $$X_i(t) = F'_i(t) - Z(t) \quad [2]$$

in the logarithmic domain, where $F'_i(t)$ is the i-th component of the unnormalized vector at time t, and where Z(t) is a weighted mean of the components of F'(t) and Z(t−1) according to Equations 3 and 4:

$$Z(t) = 0.9Z(t-1) + 0.1M(t) \quad [3]$$

and where $$M(t) = \frac{1}{20} \sum_i F'_i(t) \quad [4]$$

The normalized twenty dimension feature vector X(t) may be further processed by an adaptive labeler 70 to adapt to variations in pronunciation of speech sounds. An adapted twenty dimension feature vector X'(t) is generated by subtracting a twenty dimension adaptation vector A(t) from the twenty dimension feature vector X(t) provided to the input of the adaptive labeler 70. The adaptation vector A(t) at time t may, for example, be given by the formula $$A(t) = \frac{A(t-1) + k[X(t-1) - Xp(t-1)]}{(1+k)}, \quad [5]$$

where k is a fixed parameter of the adaptive labeling model, X(t−1) is the normalized twenty dimension vector input to the adaptive labeler 70 at time (t−1), Xp(t−1) is the adaptation prototype vector (from adaptation prototype store 66) closest to the twenty dimension feature vector X(t−1) at time (t−1), and A(t−1) is the adaptation vector at time (t−1).

The twenty dimension adapted feature vector signal X'(t) from the adaptive labeler 70 is preferably provided to an auditory model 72. Auditory model 72 may, for example, provide a model of how the human auditory system perceives sound signals. An example of an auditory model is described in U.S. Pat. No. 4,980,918 to Bahl et al entitled "Speech Recognition System with Efficient Storage and Rapid Assembly of Phonological Graphs".

Preferably, according to the present invention, for each frequency band i of the adapted feature vector signal X'(t) at time t, the auditory model 72 calculates a new parameter $E_i(t)$ according to Equations 6 and 7:

$$E_i(t) = K_1 + K_2(X'_i(t))(N_i(t-1)) \quad [6]$$

where $$N_i(t) = K_3 \times N_i(t-1) - E_i(t-1) \quad [7]$$

and where $K_1$, $K_2$, and $K_3$ are fixed parameters of the auditory model.

For each centisecond time interval, the output of the auditory model 72 is a modified twenty dimension feature vector signal. This feature vector is augmented by a twenty-first dimension having a value equal to the square root of the sum of the squares of the values of the other twenty dimensions.

For each centisecond time interval, a concatenator 74 preferably concatenates nine twenty-one dimension feature vectors representing the one current centisecond time interval, the four preceding centisecond time intervals, and the four following centisecond time intervals to form a single spliced vector of 189 dimensions. Each 189 dimension spliced vector is preferably multiplied in a rotator 76 by a rotation matrix to rotate the spliced vector and to reduce the spliced vector to fifty dimensions.

The rotation matrix used in rotator 76 may be obtained, for example, by classifying into M classes a set of 189 dimension spliced vectors obtained during a training session. The covariance matrix for all of the spliced vectors in the training set is multiplied by the inverse of the within-class covariance matrix for all of the spliced vectors in all M classes. The first fifty eigenvectors of the resulting matrix form the rotation matrix. (See, for example, "Vector Quantization Procedure For Speech Recognition Systems Using Discrete Parameter Phoneme-Based Markov Word Models" by L. R. Bahl, et al, *IBM Technical Disclosure Bulletin*, Volume 32, No. 7, December 1989, pages 320 and 321.)

Window generator 58, spectrum analyzer 60, adaptive noise cancellation processor 62, short term mean normalization processor 68, adaptive labeler 70, auditory model 72, concatenator 74, and rotator 76, may be suitably programmed special purpose or general purpose digital signal processors. Prototype stores 64 and 66 may be electronic computer memory of the types discussed above.

The prototype vectors in prototype store 54 may be obtained, for example, by clustering feature vector signals from a training set into a plurality of clusters, and then calculating the mean and standard deviation for each cluster to form the parameter values of the prototype vector. When the training script comprises a series of word-segment models (forming a model of a series of words), and each word-segment model comprises a series of elementary models having specified locations in the word-segment models, the feature vector signals may be clustered by specifying that each cluster corresponds to a single elementary model in a single location in a single word-segment model. Such a method is described in more detail in U.S. patent application Ser. No. 730,714, filed on Jul. 16, 1991, entitled "Fast Algorithm for Deriving Acoustic Prototypes for Automatic Speech Recognition."

Alternatively, all acoustic feature vectors generated by the utterance of a training text and which correspond to a given elementary model may be clustered by K-means Euclidean clustering or K-means Gaussian clustering, or both. Such a method is described, for example, by Bahl et al in U.S. Pat. No. 5,182,773 entitled "Speaker-Independent Label Coding Apparatus".

Figure 7:
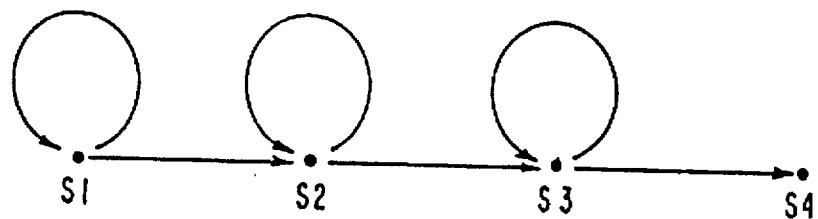
FIG. 7 schematically shows an example of an acoustic command model.
Figure 8:
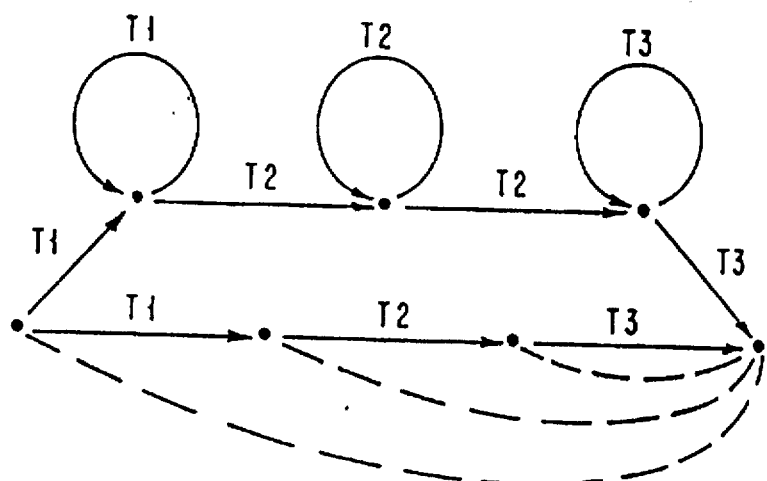
FIG. 8 schematically shows an example of an acoustic model of a phoneme for constructing an acoustic command model.

FIG. 7 schematically shows a hypothetical example of an acoustic command model. The hypothetical model shown in FIG. 7 has a starting state S1, an ending state S4, and a plurality of paths from the startling state S1 to the ending state FIG. 8 schematically shows a hypothetical example of an acoustic Markov model of a phoneme. In this example, the acoustic phoneme model comprises three occurrences of transition T1, four occurrences of transition T2, and three occurrences of transition T3. The transitions shown in dotted lines are null transitions.

Each solid-line transition in the acoustic models of FIGS. 7 and 8 has at least one model output comprising an acoustic feature value. Each model output has an output probability. Each null transition has no output. Each solid line transition and each dotted line transition from a state has a probability of occurrence when the model is in that state.

Figure 9:
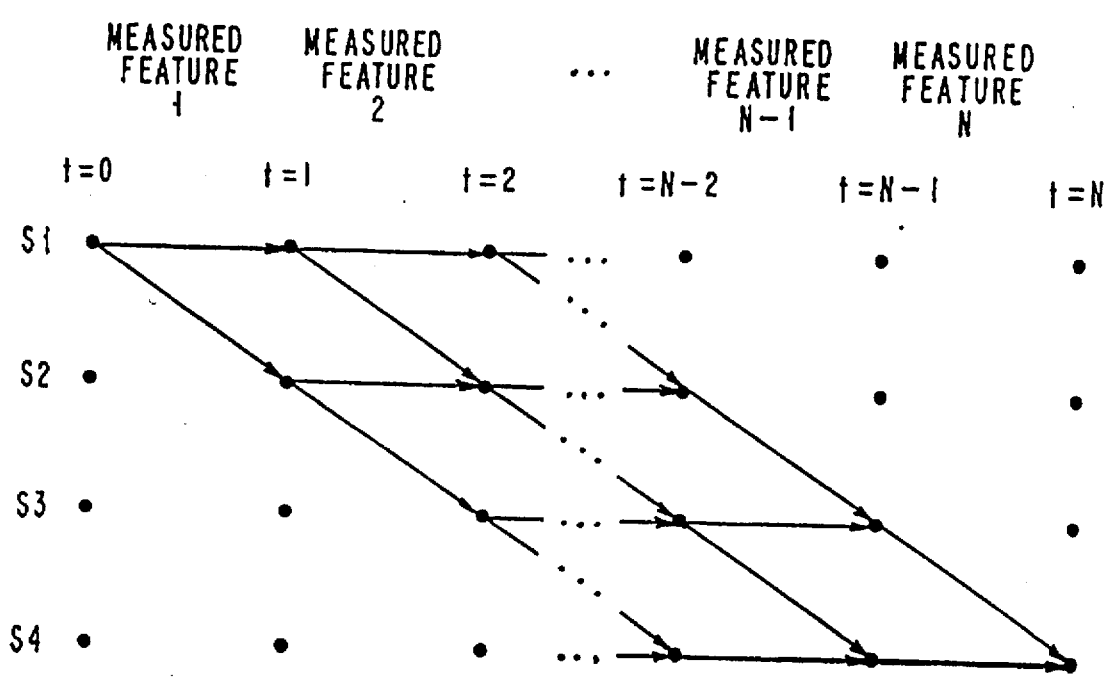
FIG. 9 schematically shows an example of paths through the acoustic model of FIG. 7.

FIG. 9 shows a hypothetical example of paths through the acoustic model of FIG. 7. The match score for an utterance and an acoustic command model is the sum of the probabilities of the measured features of the utterance for all paths through the acoustic command model. For each path, the probability of the measured features of the utterance is equal to the product of the probabilities of the transitions along the path times the probabilities of the measured features at each transition along the path.

Preferably, the interactive computer system according to the invention may be made by suitably programming a general purpose digital computer system. More specifically, the processor 10, the image object identifier 26, and the active-state command model vocabulary identifier 30 may be made by suitably programming a general purpose digital processor. The system acoustic command model vocabulary store 28 and the active-state acoustic command models store 34 may be electronic computer memory. The display means 12 may comprise a video display such as a cathode ray tube, a liquid crystal display, or a printer.

As mentioned above, the target computer program may be one or more application programs and an operating system program. For example, the target computer program may be IBM OS/2 (trademark) version 2.0, and Presentation Manager (trademark).

IBM's OS/2 version 2.0 operating system and Presentation Manager have application program interface calls in various languages, including the C programming language, the assembly programming language, and the REXX programming language. The complete collection of application program interface calls is part of the OS/2 2.0 Technical Library. The syntax for the application program interface calls in a language is compatible with how standard calls operate in the language. The name of a particular application program interface call may be different for different languages. Also, some aspects of the application program interface in one language may not be supported from another language.

For the C programming language, the application program interface consists of many library calls. C programming language source code be compiled with the IBM C Set/2 compiler.

Examples I to V illustrate C programming language source code for OS/2 and Presentation Manager for (a) creating and displaying an image, (b) reading the active state image to identify at least one object displayed in the active state image, (c) creating the vocabulary from the active state image, (d) defining the vocabulary to the speech recognizer, and (e) outputting a command signal corresponding to the command model from an active-state vocabulary having the best match score.

EXAMPLE I

Example I illustrates C programming language source code for creating the hypothetical first active-state image shown in FIG. 2.

There is a concept of a "standard window" in OS/2 and Presentation Manager. A standard window is a combination of several commonly-used windows. In FIG. 2, the frame window, title bar, system menu and menu bar can be considered to be part of a standard window. The standard window is created with the following C programming language source code using the OS/2 application program interface call WincreateStdWindow( ). The comments following the double slashes (//) describe the operation of the source code.

```
#define INCL_WIN                    // Required to get Presentation
                                    // Manager definitions.
#include <os2.h>                    // Required to get Presentation
                                    // Manager definitions.
                                    // Prototype definition for window
                                    // procedure.
MRESULT EXPENTRY SampleProc( HWND hwnd, ULONG ulMsg, MPARAM mp1,
                    MPARAM mp2 );
HWND        hwndFrame;              // This is a variable to hold a "handle"
                                    // to a frame window. A window handle is
                                    // unique for each window.
HWND        hwndClient;             // This is a variable to hold a "handle"
                                    // to a client window.
ULONG       ulFlags;                // This is a variable for the frame data
                                    // to be used at creation.
HAB         hAB;                    // A Presentation Manager anchor block
                                    // handle . . . not important for this
                                    // example. It's a handle which is
                                    // received during initialization and
                                    // used when terminating.
HMQ         hMQ;                    // A message queue. Presentation Manager
                                    // uses this to send messages to the
                                    // application windows.
                                    // All applications must make this call
                                    // to initialize Presentation Manager.
      hAB = WinInitialize(0);
                                    // Create a message queue for
```

```
                              // Presentation Manager to use. The
                              // second parameter means to take the
                              // default size of message queue.
        hMQ = WinCreateMsgQueue( hAB, 0 );
                              // Register the class of our client
                              // window. This specifies a function
                              // which Presentation Manager will use
                              // to send messages of events that the
                              // window would like to know about. Some
                              // messages are WM_SIZE which tells the
                              // window that its size is changing,
                              // WM_CREATE which tells a window that it
                              // is being created, and WM_BUTTON1DOWN
                              // which tells when a mouse button has
                              // been clicked in the window.
        // The arguments for WinRegisterClass( ):
        //
        //      hAB             - the handle received from
        //                        WinInitialize( ).
        //      "Generic"       - the name of our window class. This
        //                        string will be used to create a window
        //                        of our type.
        //      SampleProc      - the name of our window procedure as
        //                        defined with the above prototype.
        //      0L              - class style . . . none
        //      0L              - Amount of special storage reserved
        //                        for application's use . . . none.
        WinRegisterClass( hAB,
                        "Generic",
                        SampleProc,
                        0L,
                        0L );
                              // Set up the frame creation data to
                              // specify some of the specific windows
                              // desired.
        ulFlags = FCF_TITLEBAR | FCF_SYSMENU | FCF_BORDER;
        // The arguments for WinCreateStdWindow( ):
        //
        //      HWND_DESKTOP    - the parent window. Make the frame to
        //                        be the child of the Presentation
        //                        Manager desk top.
        //      0L              - frame style . . . none
        //      ulFlags         - frame creation flags
        //      "Generic"       - our previously registered window
        //                        procedure.
        //      "Title"         - title to be in title bar.
        //      0L              - client window style . . . none
        //      NULLHANDLE      - implies that frame resources, such as
        //                        the menu bar description are
        //                        compiled into the resultant EXE using
        //                        the resource compiler that is part of
        //                        the OS/2 Toolkit for its application
        //                        program interface.
        //      10              - ID of the resources in the EXE.
        //      &hwndClient     - pass the address of the client window
        //                        handle so that the application program
        //                        interface can copy back the newly
        //                        created client handle.
        hwndFrame = WinCreateStdWindow( HWND_DESKTOP,
                        0L,
                        &ulFlags,
                        "Generic",
                        "Title",
                        0L,
                        NULLHANDLE,
                        10,
                        &hwndClient );
                              // Size and position the frame on the
                              // screen, and make it visible with
                              // WinSetWindowPos( ).
        // The arguments for WinSetWindowPos( ):
        //
        //      hwndFrame       - handle to our frame for which we want
        //                        to set the size and position.
        //      HWND_TOP        - set the frame above all other frames
        //                        so that it can be seen and used.
        //      10, 20          - the desired position (x, y ).
        //      300, 500        - the desired size (width, height).
        //      SWP_ . . .      - flags telling Presentation Manager to
        //                        process the size, move the window,
```

-continued

```
    //                  and show it.
    //
WinSetWindowPos( hwndFrame,
                HWND_TOP,
                10,  20,
                300, 500,
                SWP_SIZE | SWP_MOVE | SWP_SHOW);
    // Presentation Manager is a message based system and
    // during the create call, a WM_CREATE message is sent to
    // the above-registered window procedure. The other child
    // windows are created while processing this message. This
    // is depicted below:
MRESULT EXPENTRY SampleProc( HWND hwndClient, ULONG ulMsg,
                            MPARAM mp1, MPARAM mp2);

{
  HWND hwndList;
  HWND hwndButton;
  switch( ulMsg )
  {
          .
          .
          .
      case WM_CREATE:
                    // We are processing the WM_CREATE
                    // message for our client window which is
                    // just being created. The passed window
                    // handle, hwndClient, will be returned
                    // via the last parameter in the
                    // WinCreateStdWindow( ) call.
                    // Now create the child list box.
                    // The arguments for WinCreateWindow( ):
                    //
                    //      hwndClient       - set the parent to be
                    //                         the client window.
                    //      WC_LISTBOX       - window class. This is
                    //                         a list box.
                    //      " "              - no title text
                    //                         associated with the
                    //                         list box.
                    //      WS_ ...          - window styles ... make a
                    //                         visible pushbutton.
                    //      0, 0             - initial coordinates at
                    //                         which to place window.
                    //      50, 30           - initial size of
                    //                         window.
                    //      hwndClient       - set the owner to be
                    //                         the client window.
                    //      HWND_TOP         - place this window
                    //                         above all others.
                    //      ID-BUTTON        - window id.
                    //      NULL             - no control data
                    //      NULL             - no presentation
                    //                         parameters
                    //
      hwndList = WinCreateWindow( hwndClient,
                        WC_LISTBOX,
                        " ",
                        WS_VISIBLE | LS_MULTIPLESEL,
                        0,  0,
                        50, 30,
                        hwndClient,
                        HWND_TOP,
                        ID_LISTBOX,
                        NULL,
                        NULL );
                    // The arguments for WinCreateWindow( )
                    // are the same as above, with the
                    // exceptions that there are different
                    // window styles for the button class,
                    // there is a different class name, the
                    // ID is different, and the button
                    // has meaningful text.
                    //
      hwndButton = WinCreateWindow( hwndClient,
                        WC_BUTTON,
                        "Help",
                        WS_VISIBLE | BS_PUSHBUTTON,
                        0,   70,
                        100, 250,
                        hwndClient,
```

```
                            HWND_TOP,
                            ID_BUTTON,
                            NULL,
                            NULL );
                    // Finished processing the message.
                    // Return control to Presentation
                    // Manager.
            break;
                .
                .
                .
        }
            return( FALSE );
        }
```

EXAMPLE II

Example II illustrates C programming language source code for reading an active-state image.

Presentation Manager provides an application program interface call for any application to put a "hook" into the queues of messages which are passed back and forth between windows. A hook is installed with a call back function which gets called with every message which is sent. Call back functions for hooks must reside in a presentation manager dynamic link library. The required procedure is to load the dynamic link library which contains the call back function and then load the hook.

```
HMODULE hm;                    // A handle for a loaded dynamic link library
                               // a frame window. A window handle is unique
                               // This is the function prototype for the
                               // callback. It follows the syntax for a
                               // SendMsgHook as described in the IBM
                               // Presentation Manager Programming Reference,
                               // Volume III.
VOID EXPENTRY CallbackProc( HAB hAB, PSMHSTRUCT pSmh,
                            BOOL bTask );
        // To load the dynamic link library with the callback
        // function use DosLoadModule( ).
        // The arguments for DosLoadModule( ) are the following:
        //
        //      NULL           - no buffer to return error information
        //      0              - length of buffer
        //      "MYDLL"        - name of DLL to load
        //      &hm            - address where to return the module
        //                       handle
DosLoadModule( NULL,
               0,
               "MYDLL",
               &hm );
        // Now set the hook. The arguments for WinSetHook( ) are as
        // follows:
        //
        //      hAB            - anchor block handle received from
        //                       Presentation Manager initialization.
        //      NULLHANDLE     - hook the Presentation Manager system
        //                       queue
        //      HK_SEND        - install a hook for sent messages
        //      CallbackProc   - callback procedure from the loaded
        //                       dynamic link library
        //      hm             - handle to the loaded module
        //
WinSetHook( hAB,
            hMQ,
            HK_SENDMSG,
            (PFN)CallbackProc,
            hm );
        // With the hook installed the call back routine will get
        // called every time a message is sent in Presentation
        // Manager. One message that contains information that a
        // new image (window) is active is WM_SETFOCUS. It can
        // be processed a follows to get the frame window which is
        // active.
VOID EXPENTRY CallbackProc( HAB hAB, PSMHSTRUCT pSmh, BOOL bTask )
{
                               // Declaring some variables.
        HWND hwndWithFocus;
        HWND hwndFrame;
        HWND hwndParent;
```

```
HWND hwndDesktop;
if (pSmh->msg == WM_SETFOCUS)
{
                              // The call back has been called
                              // with a WM_SETFOCUS Message.
                              // Unpack the message's second
                              // parameter. This tells if the
                              // message is for a window
                              // receiving or losing focus.
    if (SHORT1FROMMP(pSmh->mp2))
    {
                              // This window is receiving the
                              // focus.
        hwndWithFocus = pSmh->hwnd;
                              // This may be a child window of
                              // an actual image becoming
                              // active. Get the absolute
                              // parent which is a frame. Look
                              // until we've reached the
                              // Presentation Manager desk top
                              // which is the root of all
                              // visible windows.
                              // Get the desk top handle as a
                              // comparison for the limit.
        hwndDesktop = WinQueryDesktopWindow( hAB, NULLHANDLE );
        hwndParent = hwndWithFocus;
                              // Loop to find the last parent
                              // in the window chain.
        while( hwndParent != hwndDesktop )
        {
            hwndFrame = hwndParent;
                              // Query for the next parent.
            hwndParent = WinQueryWindow( hwndFrame, QW_PARENT );
        }
        // ==========================================================
        // At this point hwndFrame is the frame for the active
        // image!
        // ==========================================================
    }
}
}
```

EXAMPLE III

Example III illustrates C programming language source code for identifying the list of active-state commands from the active-state image.

The procedure for creating the list of active-state commands from the image is as follows. (1) Create a list of all the windows which are children (direct or indirect) of the active frame found above. (2) Identify all windows in the list by their window class. (3) For windows from window classes which display text to the user, query all the window text (hidden and visible). (4) Combine a global list of words with a standard list of words for each window type and with the words which were queried from the application in step (3).

Step (4) merely involves combining multiple arrays of words into one array of words. Therefore, source code for Step (4) is not illustrated.

```
                // Step (1) Create a list of all the windows which are
                //          children (direct or indirect) of the
                //          active frame found above.
                // Assume that we won't have more than 100 child
                // windows.
HWND AllWindows[100];       // Declare an array to hold the
                            // window handles.
int index = 0;              // Index at which to put windows
                            // into the AllWindows[ ] array.
HWND hwndFrame;             // Assume to be initialized to
                            // the active window in the
                            // CallbackProc( ) as outlined
                            // above.
                // Use a recursive function to get all children.
                // Call it initially with the frame:
                //
                //         FindChildren( hwndFrame );
VOID FindChildren( HWND hwndParent )
{
    HENUM    hwndList;
    HWND     hwndChild;
                // Put this window on the list. Increment the index
```

```
              // to point to the next available slot in the array.
        AllWindows[ index ] = hwndChild;
        index = index + 1;
              // Initiate an enumeration of the immediate child
              // windows. An enumeration handle, hwndList, is
              // returned. It is used to sequentially access all
              // the child windows.
        hwndList = WinBeginEnumWindows( hwndParent );
              // Loop through all the children until the enumeration
              // returns a 0 window handle which means that there
              // are no more windows.
        while( hwndChild = WinGetNextWindow( hwndList ) )
        {
              // For each window call this function again to get all
              // the children of THIS window.
              FindChildren( hwndChild );
        }
              // End the enumeration.
        WinEndEnumWindows( hwndList );
}
              // Step (2) Identify all windows in the list by their
              //         window class.
              // For each window in the list, get its type.
int     i;                          // counting index
CHAR    szBuffer[200];              // buffer to get class name
int     BufSize = sizeof(szBuffer);
HWND    hwnd;
        for (i = 0; i < index; i++ )
        {
              hwnd = AllWindows[ i ];
              // This next function returns the class name as a
              // string in the buffer which is passed as an
              // argument.
              WinQueryClassName( hwnd, BufSize, szBuffer );
              // Here are some class names defined in Presentation
              // Manager as generic windows. The actual strings are
              // enclosed in quotes, following C programming
              // language string conventions.
              //
              //   "#1"   a frame window
              //   "#3"   a button
              //   "#4"   a menu
              //   "#7"   a list box
              //   "#8"   a scroll bar
        }
              // Step (3) For windows from window classes which
              //           display text to the user, query all the
              //           window text (hidden and visible).
              // In this code sample it is shown how to read text
              // displayed by an application.
              //   - Assume that no text is longer than 200 bytes
              //     for this example.
              //   - Assume that pBuffer is pointing to a buffer of
              //     shared memory which has been given to the
              //     process in which the window resides.
              //   - Assume that classname has been filled with the
              //     class name of the object as described in (2)
              //     above.
CHAR    classname[100];
CHAR    *pBuffer;
int     BufSize = 201;
int     ListboxCount;
int     i;
              // Get application text for list boxes and buttons.
        if (strcmp( classname, "#3" ) == 0)
        {
              // This is a button. Get its text.
              WinQueryWindowText( hwndButton, BufSize, pBuffer );
        }
        if (strcmp( classname, "#7" ) == 0)
        {
              // This is a list box. Loop through all of the items
              // to get all the text. Interfacing with the list box
              // requires the Presentation Manager application
              // program interface call WinSendMsg( ). It always has
              // the same 4 parameters,
              //    - window handle
              //    - message
              //    - message-specific parameter or 0
              //    - message-specific parameter or 0
```

```
                                            -continued

ListboxCount = WinSendMsg( hwndListbox, LM_QUERYITEMCOUNT,
                                  0, 0 );
         // Here's the loop.
      for (i = 0; i < ListboxCount; i++
      {
         // Use Presentation Manager application program
         // interface packing macros for the last 2 parameters.
         // The first is made of two numbers.
         //
         //       MPFROM2SHORT( index of item, buffer size )
         //
         //    The second is a pointer to the buffer.
         //
         //       MPFROMP( buffer )
         WinSendMsg( hwndListbox,
                     LM_QUERYITEMTEXT,
                     MPFROM2SHORT( i, BufSize ),
                     MPFROMP( pBuffer ) );
         // The text for one item is in the buffer now. It
         // should be copied to be saved somewhere.
      }
   }
```

EXAMPLE IV

Example IV illustrates C programming language source code for defining the active-state vocabulary to the speech recognizer.

An application program interface for the speech recognizer is used to set it up for recognition. A possible application program interface which can be used is the Speech Manager (trademark) application program interface that comes with the IBM Speech Server Series (trademark) product. Source code for a similar application program interface will be shown below.

```
#include    "smapi.h"        // Speech Manager application
                             // program interface header file
SmArg       Args[9];         // Local variable - array of
                             // arguments used to initialize the
                             // speech system.
int         iNumArgs;
            // Initialize the speech system. No parameters are used.
            //
            SmOpen( 0, NULL );
            // Set up the arguments to be used to make a connection.
            // The second parameter in the SmSetArg( ) function is the
            // name of the argument. The third parameter is the value.
            //
                             // Initialize for recognition.
            SmSetArg( Args[0], SmNrecognize, TRUE );
                             // This is the user ID.
            SmSetArg( Args[3], SmNuserId, "User");
            //  "Active Vocabulary"    - name to be associated with the
            //                           vocabulary
            //  35                     - number of words in the
            //                           vocabulary
            //  pWords                 - a pointer to an array of the
            //                           words in a form specified by
            //                           the application program
            //                           interface.
            //  SmAsynchronous         - make the call asynchronously
            SmDefineVocab( "Active Vocabulary", 35, pWords,
                           SmAsynchronous );
            // To enable the vocabulary for recognition, the
            // application program interface call,
            //    SmEnableVocab( ) is used.
            // The arguments for SmEnableVocab( ):
            //
            //  "Active Vocabulary"    - name of the vocabulary to
            //                           enable
            //  SmAsynchronous         - make the call asynchronously
            SmEnableVocab( "Active Vocabulary", SmAsynchronous );
            // The system is now ready for recognition. To begin
            // recognizing, the microphone is turned on using
```

```
// SmMicOn( ), and a word is requested using
// SmRecognizeNextWord( ). Both calls are made
// asynchronously here.
SmMicOn( SmAsynchronous );
SmRecognizeNextWord( SmAsynchronous );
```

EXAMPLE V

Example V illustrates C programming language source code for outputting a command signal corresponding to the command model from an active-state vocabulary having the best match score.

To begin, a list of commands and command-object associations is manually defined as described above. Each command, with the exception of the global commands, is associated with an object.

Assume the word "RIGHT" from Table 1 is recognized. From the list of command-object associations, the target for the command is known. This target is designated hwndTarget in the example.
HWND hwndTarget;

The action defined by "RIGHT" for this target is to move the target to the right by a previously-defined increment, for example 10 picture elements (pels).
define INCREMENT_RIGHT 10

The command is performed on the target using the OS/2 Presentation Manager application program interface call named WinSetWindowPos(). The current window position must be queried first so that the new position can be determined.

```
SWP swp;              // Presentation Manager structure for
                      // window position
   // Get the initial window position.
   //   hwndTarget    - target window or object
   //   &swp          - address where the target's window
                        features will be returned
   WinQueryWindowPos( hwndTarget, &swp );
   // Execute the command, "RIGHT."
   //
   //   hwndTarget    - target window or object
```

```
//   NULLHANDLE     - unneeded parameter
//   swp.x + INCREMENT_RIGHT
//                   - new x-coordinate for window
//   swp.y           - use the same y-coordinate
//   0, 0,           - unneeded parameters
//   SWP_MOVE        - tell the window to move
//
WinSetWindowPos( hwndTarget,
                 NULLHANDLE,
                 swp.x + INCREMENT_RIGHT,
                 swp.y,
                 0, 0,
                 SWP_MOVE );
```

Instead, assume the word, "ORANGE," is recognized. From the list of command-object associations, the target for the command is known. This is hwndTarget in the example.

```
HWND       hwndTarget;
```

The action defined by "ORANGE" for this target is to select the entry in the listbox. The command is performed on the target by sending a message, LM_SELECTITEM, to the listbox using the OS/2 Presentation Manager application interface call named WinSendMsg(). First the index of the item has to be found.

```
SHORT sItem;            // item index for querying
   // Find the recognized word in the list.
   //
   //   hwndTarget       - target window or object
   //   LM_SEARCHSTRING  - message being sent
   //   MPFROM2SHORT( )  - Presentation Manager packing macro
   //   LSS_PREFIX       - ask for the item index which
   //                      begins with the string in the next
   //                      parameter
   //   LIT_FIRST        - ask for the first item that
   //                      matches
   //   MPFROMP( )       - Presentation Manager packing macro
   /    pListboxWord     - the recognized word "ORANGE"
   //
   sItem = (SHORT)WinSendMsg ( hwndTarget,
                               LM_SEARCHSTRING,
                               MPFROM2SHORT( LSS_PREFIX,
                                             LIT_FIRST ),
                               MPFROMP( pListboxWord ) );
   // Select the recognized word.
   //
   //   hwndTarget       - target window or object
   //   LM_SELECTITEM    - message being sent
   //   sItem            - the item in the list to act upon
   //   TRUE             - select the item
```

```
//
WinSendMsg( hwndTarget,
            LM_SELECTITEM,
            MPFROMSHORT( sItem ),
            MPFROMLONG( TRUE ) );
```

We claim:

1. An interactive computer system comprising:

a processor executing a target computer program having a series of active program states occurring over a succession of time periods, said target computer program generating active state image data signals representing an active state image for an active state of the target computer program occurring during each time period, each active state image containing one or more objects;

means for displaying at least a first active-state image for a first active state occurring during a first time period;

means for identifying an object displayed in the first active-state image, and for generating from an identified object displayed in the first active-state image a list of one or more first active-state commands identifying a first active-state function which can be performed in the first active state of the target computer program;

means for storing a system vocabulary of acoustic command models, each acoustic command model representing one or more series of acoustic feature values representing an utterance of one or more words associated with the acoustic command model;

means for identifying a first active-state vocabulary of acoustic command models for the first active state, the first active-state vocabulary comprising the acoustic command models from the system vocabulary representing the first active-state commands, wherein the first active-state vocabulary changes dynamically as a function of both the identity of the target computer program and the active state image data signals which identify an active state of the target computer program; and a speech recognizer for measuring a value of at least one feature of an utterance during each of a first sequence of time intervals within the first time period to produce a first series of feature signals, said speech recognizer comparing the first series of feature signals to each of the acoustic command models in the first active-state vocabulary to generate a match score for the utterance and each acoustic command model, and said speech recognizer outputting a command signal corresponding to the acoustic command model from the first active-state vocabulary having a best match score.

2. An interactive computer system as claimed in claim 1, characterized in that:

the first active-state vocabulary comprises substantially less than all of the acoustic command models from the system vocabulary; and the speech recognizer does not compare the measured feature signals for the first time period to any acoustic command model which is not in the first active-state vocabulary.

3. An interactive computer system as claimed in claim 2, characterized in that:

the means for displaying displays at least a second active-state image different from the first active-state image for a second active state occurring during a second time period different from the first time period;

the means for identifying an object identifies an object displayed in the second active-state image, and generates from an identified object displayed in the second active-state image a catalog of one or more second active-state commands identifying a second active-state function function which can be performed in the second active state of the target computer program;

the means for identifying a first active-state vocabulary identifies a second active-state vocabulary of acoustic command models for the second active state, the second active-state vocabulary comprising the acoustic command models from the system vocabulary representing the second active-state commands, the second active-state vocabulary being at least partly different from the first active-state vocabulary; and the speech recognizer measures the value of at least one feature of the utterance during each of a second sequence of time intervals within the second time period to produce a second series of feature signals, said speech recognizer comparing the second series of feature signals for the second time period to each of the acoustic command models in the second active-state vocabulary to generate the match score for the utterance and each acoustic command model, and said speech recognizer outputting the command signal corresponding to the acoustic command model from the second active-state vocabulary having the best match score.

4. An interactive computer system as claimed in claim 3, characterized in that the target computer program has only one active state occurring during each time period.

5. An interactive computer system as claimed in claim 4, characterized in that the target computer program comprises an operating system program.

6. An interactive computer system as claimed in claim 5, characterized in that the target computer program comprises an application program and an operating system program.

7. An interactive computer system as claimed in claim 6, characterized in that the target computer program comprises two or more application programs and an operating system program.

8. An interactive computer system as claimed in claim 6, characterized in that at least some commands for the active-state identify functions which can be performed on the identified object in the active-state image for the active-state.

9. An interactive computer system as claimed in claim 8, characterized in that the identified object in the active-state image comprises one or more of a character, a word, an icon, a button, a scroll bar, a slider, a list box, a menu, a check box, a container, or a notebook.

10. An interactive computer system as claimed in claim 9, characterized in that the speech recognizer outputs two or more command signals corresponding to the command models from the active-state vocabulary having best match scores for a given time period.

11. An interactive computer system as claimed in claim 10, characterized in that the active-state vocabulary of acoustic command models for each active state further comprises a set of global acoustic command models representing global commands identifying functions which can be performed in each active state of the target computer program.

12. An interactive computer system as claimed in claim 11, characterized in that the means for displaying comprises a display.

13. An interactive computer system as claimed in claim 11, characterized in that the means for displaying displays both the active-state image for the active state occurring during a time period, and at least a portion of one or more images for program states not occurring during the time period.

14. A method of computer interaction comprising:

execusing, on a processor, a target computer program having a series of active program states occurring over a succession of time periods, said target computer program generating active state image data signals representing an active state image for an active state of the target computer program occurring during each time period, each active state image containing one or more objects;

displaying at least a first active-state image for a first active state occurring during a first time period;

identifying an object displayed in the first active-state image, and generating from an identified object displayed in the first active-state image a list of one or more first active-state commands identifying a first active-state function which can be performed in the first active state of the target computer program;

storing a system vocabulary of acoustic command models, each acoustic command model representing one or more series of acoustic feature values representing an utterance of one or more words associated with the acoustic command model;

identifying a first active-state vocabulary of acoustic command models for the first active state, the first active-state vocabulary comprising the acoustic command models from the system vocabulary representing the first active-state commands wherein the first active-state vocabulary changes dynamically as a function of both the identity of the target computer program and the active state image data signals which identify an active state of the target computer program; and measuring a value of at least one feature of an utterance during each of first sequence of time intervals within the first time period to produce a first series of feature signals;

comparing the first series of feature signals to each of the acoustic command models in the first active-state vocabulary to generate a match score for the utterance and each acoustic command model; and outputting a command signal corresponding to the acoustic command model from the first active-state vocabulary having a best match score.

15. A method of computer interaction as claimed in claim 14, characterized in that:

the first active-state vocabulary comprises substantially less than all of the acoustic command models from the system vocabulary; and the step of comparing does not compare the measured feature signals for the first time period to any acoustic command model which is not in the first active-state vocabulary.

16. A method of computer interaction as claimed in claim 15, further comprising the steps of:

displaying at least a second active-state image different from the first active-state image for a second active state occurring during a second time period different from the first time period;

identifying an object displayed in the second active-state image, and generating from an identified object displayed in the second active-state image a catalog of one or more second active-state commands identifying a second active-state function which can be performed in the second active state of the target computer program;

identifying a second active-state vocabulary of acoustic command models for the second active state, the second active-state vocabulary comprising the acoustic command models from the system vocabulary representing the second active-state commands, the second active-state vocabulary being at least partly different from the first active-state vocabulary;

measuring the value of at least one feature of the utterance during each of a second sequence of time intervals within the second time period to produce a series of feature signals;

comparing the second series of feature signals for the second time period to each of the acoustic command models in the second active-state vocabulary to generate the match score for the utterance and each acoustic command model; and outputting the command signal corresponding to the acoustic command model from the second active-state vocabulary having the best match score.

17. A method of computer interaction as claimed in claim 16, characterized in that the target computer program has only one active state occurring during each time period.

18. A method of computer interaction as claimed in claim 17, characterized in that the target computer program comprises an operating system program.

19. A method of computer interaction as claimed in claim 18, characterized in that the target computer program comprises an application program and an operating system program.

20. A method of computer interaction as claimed in claim 19, characterized in that the target computer program comprises two or more application programs and an operating system program.

21. A method of computer interaction as claimed in claim 19, characterized in that at least some commands for the active-state identify functions which can be performed on the identified object in the active-state image for the active state.

22. A method of computer interaction as claimed in claim 21, characterized in that the identified object in the active-state image comprises one or more of a character, a word, an icon, a button, a scroll bar, a slider, a list box, a menu, a check box, a container, or a notebook.

23. A method of computer interaction as claimed in claim 22, characterized in that the step of outputting a command signal comprises outputting two or more command signals corresponding to the command models from the active-state vocabulary having best match scores for a given time period.

24. A method of computer interaction as claimed in claim 23, characterized in that the active-state vocabulary of acoustic command models for each active state further comprises a set of global acoustic command models representing global commands identifying functions which can be performed in each active state of the target computer program.

25. A method of computer interaction as claimed in claim 24, further comprising the step of displaying both the active-state image for the active state occurring during a time period, and at least a portion of one or more images for program states not occurring during the time period.

* * * * *